United States Patent Office 3,042,585
Patented July 3, 1962

3,042,585
FERMENTATION PROCESS FOR PRODUCING L-GLUTAMIC ACID
Tetsuo Ogawa, Tokyo, Toshinao Tsunoda, Kanagawa-ken, and Shinji Okumura and Asaichiro Ozaki, Tokyo, Japan, assignors to Ajinomoto Company, Inc. and Sanraku Distillers Company, Inc., both of Tokyo, Japan
No Drawing. Filed Feb. 21, 1961, Ser. No. 104,191
Claims priority, application Japan Apr. 20, 1957
8 Claims. (Cl. 195—47)

The present invention relates to a fermentative process for producing L-glutamic acid and more particularly is directed to a process for producing L-glutamic acid from crude hydrolyzed mash of starch by the fermentative action of bacteria analogous to Bacillus circulans, which bacteria is hereinafter identified as ATCC No. 13403, and has been deposited at the American Type Culture Collection, Washington, D.C., where it is identified as Accession No. 13,403. This application is a continuation-in-part of our co-pending application identified as Serial No. 728,038, filed April 14, 1958.

The inventors have found that, if a culture medium comprising crude hydrolyzed mash of starch, and containing glucose, maltose and a small amount of dextrin, as the carbon source, and sodium nitrate as the nitrogen source together with a minute quantity of organic nitrogen and some inorganic salts requisite for growth of bacteria, is inoculated with bacteria ATCC No. 13,403, which has a peculiar and powerful L-glutamic acid producing effect, and which was newly isolated by the inventors and found analogous to Bacillus circulans, and if the inoculated medium is subjected to either submerged culture or shaking culture under aerobic conditions, a remarkable amount of L-glutamic acid is produced. Under the foregoing conditions, carbohydrates contained in the crude hydrolyzed mash of starch and sodium nitrate are fermented by the bacteria ATCC No. 13,403 and no addition of neutralizer is required. Sodium nitrate is metabolized by bacteria ATCC No. 13,403, a main part thereof being converted to the amino group of L-glutamic acid and a part of the nitric radical being utilized for growth of the bacteria. Freed sodium ions serve to neutralize the L-glutamic acid in acid form, which is the main product, and other organic acids, which are byproducts of the described process. L-glutamic acid is thus produced and accumulated in the culture medium in high concentration and with high yield.

The main features of the process embodying this invention are as follows:

(I) Utilization of sodium nitrate as the nitrogen source for the formation of the amino group in the L-glutamic acid to be produced.

(II) Utilization of the identified bacteria having a peculiar and powerful L-glutamic acid producing effect, and which was newly isolated from nature by the inventors and found analogous to Bacillus circulans.

(III) Utilization of crude hydrolyzed mash of starch as the carbon source in the described fermentation. These three characteristic features not only have various advantages, as hereinafter described in detail, but also facilitate and reduce the cost of the fermentative production of L-glutamic acid on an industrial scale.

(I) *Utilization of Sodium Nitrate as the Nitrogen Source and Neutralizing Agent*

In those cases where sugars or starch are fermented to produce L-glutamic acid, it is apparent that the carbon skeleton of L-glutamic acid is reformed from such materials as the carbon source. The formation of the amino group in the molecule of L-glutamic acid, has been achieved by the use of the inorganic salts of ammonium or urea. From these ammonium salts and urea, the inventors turned their attention to sodium nitrate. In order to ascertain the productivity of L-glutamic acid from various ammonium salts, urea, sodium nitrate, etc., the inventors searched for and isolated many strains of bacteria from culture media containing sugars and ammonium salts, sugars and urea, sugars and sodium nitrate, as well as sugars and organic nitrogen compounds. They further investigated the formation of L-glutamic acid by shaking cultures in glucose-ammonium salt-calcium carbonate media and glucose-sodium nitrate media. As a result of numerous experiments, it was found that the production of L-glutamic acid is remarkable when sodium nitrate is used as the nitrogen source and, in fact, that the production of L-glutamic acid is substantially higher in a sodium nitrate media than in any other media where various ammonium salts, urea or the like are used. Thus, it has been concluded that sodium nitrate is the best nitrogen source material in the fermentative production of L-glutamic acid.

The following table illustrates the yields of L-glutamic acid, given as the percent of the weight of glucose used 2.0%), during fermentation with 12 strains of bacteria which were representatively adopted from among numerous isolated bacteria and with shaking cultures carried out for three days at 30° C. The crude hydrolyzed mash of starch used in obtaining the results of Table 1 is the mash hereinafter described in detail in Example 1.

TABLE 1

| Strain No. | Species | Formation of HNO$_2$ from nitrate | Ammonium Salts (with addition of 0.5% CaCO$_3$) | | | | Sodium nitrate (without addition of CaCO$_3$), 0.6% |
|---|---|---|---|---|---|---|---|
| | | | Chloride, 0.4% | Sulfate, 0.5% | Urea, 0.3% | Phosphate, 0.5% | |
| 369 | Bacillus megatherium | − | 5.0 | 9.5 | 9.0 | 0.5 | 24.5 |
| 1906 | Unknown | − | 14.0 | 17.5 | 7.0 | 13.5 | 18.0 |
| 1972 | ----do---- | + | 8.0 | 6.5 | 6.0 | 10.5 | 18.0 |
| 1998 | ----do---- | + | 11.5 | 11.0 | 6.5 | 4.0 | 19.0 |
| 1999 | Bacillus circulans | + | 10.5 | 7.5 | 2.5 | 8.0 | 25.5 |
| 2023 | ----do---- | + | 10.0 | 8.0 | 3.5 | 7.0 | 26.5 |
| 2039 | ----do---- | + | 7.0 | 4.5 | 5.0 | 6.0 | 26.5 |
| 2077 | Unknown | + | 12.5 | 7.5 | 6.5 | 4.5 | 18.5 |
| 2158 | ----do---- | − | 17.0 | 18.5 | 4.5 | 15.0 | 22.0 |
| 2184 | ----do---- | | 12.0 | 10.0 | 1.0 | 6.5 | 24.6 |
| 2933 | ----do---- | + | 14.0 | 16.0 | 9.5 | 7.0 | 21.0 |
| 2278 | ----do---- | Unknown | 3.5 | 3.0 | 2.0 | 2.5 | 16.0 |

The advantages of utilizing sodium nitrate are as follows:

(1) The yield of L-glutamic acid is outstandingly high in comparison with those obtained when inorganic ammonium salts and urea are used.

(2) The necessity of using a specific neutralizing agent is dispensed with, because freed sodium ions neutralize the formed L-glutamic acid and the other organic acids which are by-products. This characteristic is very advantageous in the fermentation process on an industrial scale. If no neutralizer is added in those cases where ammonium salts and urea are used as nitrogen sources in the fermentative production of L-glutamic acid under aerobic conditions, the growth of inoculated bacteria is extremely inferior and L-glutamic acid cannot be produced.

Accordingly, the addition of a neutralizing agent, such as calcium carbonate, is indispensable when ammonium salt or urea is used in the fermentative production of L-glutamic acid. However, the addition of calcium carbonate inevitably causes difficulty in separating L-glutamic acid from fermented broth. The addition of other alkaline chemicals makes the industrial operation more complex and troublesome and therefore unfavorable. On the contrary, if sodium nitrate is adopted as the nitrogen source, no addition of neutralizer is required and the consequent difficulty in separating L-glutamic acid from fermented broth and complexity of industrial operation are avoided. Thus, the fermentative process can be carried out very easily and simply to produce L-glutamic acid with a high yield. This is because the nitric acid radical is metabolized by the bacteria and thus freed sodium ions neutralize the produced L-glutamic acid and other acids for keeping the culture medium in the normal state throughout the fermentation, without the addition of any other neutralizing chemical.

(3) The production of L-glutamic acid in a culture medium, wherein the nitrogen source is sodium nitrate, is not accompanied by the production of any other amino acid, such as alanine or aspartic acid, which is always a by-product when ammonium salts or urea are used as the nitrogen source. If alanine, aspartic acid and the like are by-products of the fermentation process, L-glutamic acid is contaminated by them and the yield of purified L-glutamic acid is substantially reduced. With sodium nitrate, such contamination is avoided and the separation of L-glutamic acid from fermented broth is easily performed with a higher yield.

(II) *Utilization of Bacteria ATCC No. 13,403 Which Is Analogous to Bacillus Circulans*

One of the important features of this invention resides in the use of bacteria ATCC No. 13,403 which has a peculiar and powerful L-glutamic acid producing effect and is analogous to *Bacillus circulans*. Though there are many bacteria which can produce L-glutamic acid in culture media containing sodium nitrate as the nitrogen source, the above identified strain newly isolated by the inventors from the soil in the suburb of Kawasaki City, Japan, was found extremely powerful. Combined with the adequate selection of other fermentative conditions, the adoption of the identified bacteria increases the yield of L-glutamic acid and facilitates its industrial production, by reason of the following advantages:

(1) The conversion of sugars to L-glutamic acid is as high as 40% or more.

(2) The incubation time or fermentation period is shortened to as little as two or three days.

(3) Sugar of high concentration in the culture medium can be metabolized.

The L-glutamic acid producing power of bacteria ATCC No. 13,403 under aerobic conditions is shown in the following table. The crude hydrolyzed mash of starch used in obtaining the results of Table 2 is that hereinafter described in detail in Example 2.

TABLE 2

| Concentration of sugar (percent) | Concentration of NaNO₃ (percent) | Fermentation period (hrs.) | Concentration of accumulated L-glutamic acid (percent) | Yield given as percent of sugar used |
|---|---|---|---|---|
| 4.0 | 1.0 | 41 | 1.40 | 35.0 |
| 4.0 | 1.2 | 41 | 1.56 | 39.0 |
| 4.0 | 1.4 | 65 | 1.65 | 41.3 |
| 6.0 | 1.8 | 45 | 1.84 | 30.7 |
| 6.0 | 1.8 | 67 | 2.05 | 34.2 |
| 8.0 | 2.2 | 48 | 2.14 | 26.7 |
| 8.0 | 2.2 | 72 | 2.40 | 30.0 |

As shown in Table 2, bacteria ATCC No. 13,403 shows a good tolerance of high concentrations of sugar even in culture media containing sodium nitrate. Most bacteria, which can produce good amounts of L-glutamic acid when the sugar concentration is approximately from 2% to 4%, lose much of their fermentative power if the sugar concentration is enriched over 4%. Such disposition will be understood from the following table, wherein (*) marks indicate the strains applicable to this invention, that is, bacteria ATCC No. 13,403, and the yields of L-glutamic acid are given as percentages of the glucose for various concentrations of the latter. As the crude hydrolyzed mash of starch, the mash as described in Example 2 was used.

TABLE 3

| Strain No. | Yields for sugar concentrations of— | | | Strain No. | Yields for sugar concentrations of— | | |
|---|---|---|---|---|---|---|---|
|  | 2% | 4% | 6% |  | 2% | 4% | 6% |
| 369 | 24.5 | 18.0 | 3.3 | 2039* | 26.5 | 35.6 | 23.9 |
| 1906 | 18.0 | 8.7 | 5.3 | 2077 | 18.5 | 9.2 | 7.3 |
| 1972 | 18.0 | 20.2 | 11.1 | 2158 | 22.0 | 9.8 | 5.2 |
| 1998 | 19.0 | 14.5 | 18.0 | 2184 | 24.5 | 21.8 | 8.2 |
| 1999* | 25.5 | 38.2 | 30.7 | 2333 | 21.0 | 17.5 | 13.3 |
| 2023* | 26.5 | 33.4 | 27.3 | 2278 | 16.0 | 14.2 | 8.6 |

(4) ATCC No. 13,403 bacteria have an extremely strong power to change sodium nitrate-form nitrogen to L-glutamic acid form nitrogen with high yields and a large portion of the former is converted to the latter by their peculiar faculty. Although they also have the ability to change nitrogen in the form of ammonium chloride, ammonium sulfate, urea, ammonium phosphate or the like to L-glutamic acid nitrogen, this power is feeble as indicated in Table 1 (cf. Strains No. 1999, No. 2023 and No. 2039).

The above-mentioned strong power to convert sodium nitrate nitrogen to L-glutamic acid nitrogen may be understood from the fact that portions of sodium nitrate as large as 66% to 81% contained in the culture media were changed to L-glutamic acid, as illustrated in Table 4. The major portion of the remaining nitrogen is consumed for growth of the bacteria. Considering these facts, it will be obvious that the sodium nitrate form nitrogen, with the exception of that portion to be consumed for growth of the bacteria, is almost quantitatively converted to L-glutamic acid.

The crude hydrolyzed mash of starch used in obtaining the results of Table 4 is the mash described in detail in Example 1.

TABLE 4

| Sugar, gram per deciliter | NaNO₃, gram per deciliter | N in nitrate form (A), gram per deciliter | L-glutamic acid formed, gram per deciliter | N in glutamic acid form (B), gram per deciliter | B/A (percent) | A−B, gram per deciliter |
|---|---|---|---|---|---|---|
| 4.0 | 1.0 | 0.165 | 1.40 | 0.134 | 81.3 | 0.031 |
| 4.0 | 1.2 | 0.198 | 1.56 | 0.149 | 75.0 | 0.049 |
| 4.0 | 1.4 | 0.231 | 1.65 | 0.157 | 68.0 | 0.074 |
| 6.0 | 1.8 | 0.297 | 2.05 | 0.197 | 65.7 | 0.102 |
| 8.0 | 2.2 | 0.329 | 2.40 | 0.229 | 69.5 | 0.100 |

The bacteriological features of the strains No. 1999, No. 2023 and No. 2039 of Table 3, which are bacteria ATCC No. 13,403, are as follows:

(A) MORPHOLOGICAL CHARACTERISTICS (1) Vegetative cells grown on non-glucose bouillon and glucose bouillon agar are long rods measuring 1.2–1.4$\mu$ by 7.2–12.6$\mu$, occurring usually singly and in pairs, and containing many granules, with the ends of cells being truncated rather than rounded.
(2) Motility: None.
(3) Gram strain reaction: Positive.
(4) Spore: Usually ellipsoidal, 1.2$\mu$ by 2.0$\mu$, and central or subcentral.
(5) Sporangia: More spindly than ellipsoidal, centrally swollen and terminally pinnacled and sometimes curved in an S-configuration.

(B) CULTURAL CHARACTERISTICS (1) Nutrient broth (bouillon broth and peptone water used): Non-surface growth, slightly turbid, and with a moderate, grey, viscid and flocculent sediment.
(2) Agar stroke (bouillon agar): Abundant, moist, smooth, slightly viscid, dull lustrous, grey, and opaque growth, however translucent in young stage. Filiform and becoming non-spreading with aging. During more than one month, no change was observed in the appearance of growth and medium used.
(3) Agar colony (bouillon agar colony): Small circular, smooth, grey, and translucent in young stage but becoming opaque and with no increase in size of the colony in the mature stage.
(4) Gelatin stab culture: Small circular growth on the surface of the gelatin tube and slight growth around stab line. Liquefaction occurs under the grown colony and merges into tube.
(5) Litmus milk culture: Maintained at 30° C., decolorization of litmus occurs from the bottom of the culture liquor at an early day, at the 4th day pH 6.0 is attained, and at 8th day decolorization is complete and coagulation is observed. After this, no change.

(C) PHYSIOLOGICAL CHARACTERISTICS (1) Temperature relations: Growth observed between 20° C. and 40° C. Optimum growth at 30° C., no growth at 55° C. No death under 60° C.—10 min. treatment.
(2) Relation to reaction of peptone water medium: Optimum pH for growth is 7.0, growth observed at pH 6.0 but almost no growth at pH 5.0. Slight growth observed at pH 8.0.
(3) Relation to free oxygen: A tube of deep peptone agar medium is used and good growth occurs upon the surface and only slight growth occurs in the upper layers. Accordingly this bacteria is classified as aerobe.
(4) Action on Nitrate: A static liquid culture medium comprising 0.1% $KNO_3$, 1.0% polypeptone and 0.5% NaCl was used. At the 2nd day, nitrite detected by sulfanilic acid-$\alpha$-naphtylamine acetic acid reagent and nitrogen gas produced in Durham tube. At the 8th day, the culture broth has pH 8.6.
(5) Hydrolysis of Starch: Positive.
(6) Production of acetoin: A static liquid culture medium comprising 0.5% polypeptone, 0.5% NaCl and 0.5% glucose was used. Detection by the addition of 5% solution of $\alpha$-naphtol in alcohol and 40% $KNO_3$ solution was negative. Consequently production of acetoin was not observed.
(7) Utilization of citrate in Koser's medium: These organisms did not utilize citrate as a sole source of carbon because they exhibited no growth in this medium.
(8) Catalese: Positive.
(9) Indole production: Negative.
(10) Fermentation of Sugars: Acid and no gas from glucose, sucrose, mannitol, xylose and arabinose. No acid and no gas from lactose.

The strains No. 1999, No. 2023 and No. 2039 of ATCC No. 13,403 show no essential differences in bacteriological observations, while their L-glutamic acid producing powers are somewhat different as illustrated in Table 1 and Table 3.

Considering the above-stated bacteriological features of the strains, they should be considered to be analogous to *Bacillus circulans* according to Bergen's Manual of Determinative Bacteriology, 6th edition, 1948, though their motility and gram-stain reaction differ from those of *Bacillus circulans* Jordan.

(III) *Utilization of Crude Hydrolyzed Mash of Starch*

Although numerous experiments were made by the inventors, aerobic cultures of the above identified strains in media that respectively contain sodium nitrate as the nitrogen source and pure glucose, sucrose, fructose, maltose or lactose as the carbon source, together with small quantities of mineral salts essential to growth of bacteria in general, for example, 0.6% of sodium nitrate, 2.0% of sugar, 0.1% of potassium phosphate, 0.04% of magnesium sulfate and 1 p.p.m. of iron, have all failed to produce L-glutamic acid, giving no spot on paper chromatography. Accordingly, even if L-glutamic acid is produced, the amount thereof is less than 1 milligram per deciliter. On the other hand, with a crude hydrolyzed mash of starch, such as potato, sweet potato, corn and wheat, in lieu of pure sugars, the aerobic cultures gave remarkably favorable results as illustrated in Table 5.

TABLE 5

| Culture medium | Growth | Fermented broth—L-glutamic acid, grams per deciliter |
|---|---|---|
| Crude hydrolyzate of: | | |
| Wheat | ++++ | 1.49 |
| Corn | ++++ | 1.24 |
| Potato | +++ | 1.01 |
| Sweet Potato | +++ | 0.98 |
| Tapioca | +++ | 0.87 |
| Pure: | | |
| Glucose | ± | 0.06 |
| Maltose | ± | 0.04 |
| Fructose | ± | 0.09 |
| Sucrose | ± | 0.06 |
| Soluble Starch | + | 0.11 |

The experiments were carried out under the following conditions—

Culture medium:
  Above-listed carbohydrate 4% (as sugar)
  $NaNO_3$—1.4%
  $KH_2PO_4$—0.1%
  $MgSO_4 \cdot 7H_2O$—0.04%
  $FeSO_4 \cdot 7H_2O$—0.0005%
  Casein hydrolyzate (T–N 2%)—0.1%
Crude hydrolyzate of starch:
  Filtrate of starch hydrolyzate by $H_2SO_4$
  Rate of hydrolysis—90–93%
Fermentation:
  Aerobic shaking culture for 48 hours
  Bacteria: Strain No. 1999 (ATCC No. 13,403)

The inventors further found that, as the crude saccharificated liquor of starch which contains mainly glucose, maltose and dextrin is further refined and impurities other than sugars and starch are increasingly separated, the yield of L-glutamic acid decreases. The avoidance of the necessity of purifying the crude hydrolyzed mash of starch and, moreover, the suitability of the crude hydrolyzed mash are decisive dual advantages in providing an industrial process for producing L-glutamic acid. The great cost of refining the crude hydrolyzed mash of starch is thus saved and the cost of producing L-glutamic acid is accordingly reduced. If scientifically analysed, the superior performance of the crude liquor is presumably due to certain fermentation-promoting substances contained therein. A further advantage exists in the fact that it is unnecessary to add an accelerator to pure sugar liquors (cf. Table 5).

To obtain the crude hydrolyzed mash starch of wheat, corn, potato, sweet potato, tapioca or the like may be hydrolyzed by the action of an acid, for example, hydrochloric acid, sulfuric acid or oxalic acid, or by the action of diastatic enzyme from malt, mould, yeast, gland or the like. Filtrates of the crude hydrolyzed mash of starch are more effective than the mash per se in general but in different degrees, which depend upon the kinds of starches used.

The effects of the rate of hydrolysis, filtration of hydrolyzed mash and kinds of hydrolysis catalysts upon the production and accumulation of L-glutamic acid are illustrated, by way of example, in the following tables.

TABLE 6

| Rate of hydrolysis, percent | Growth | Fermented broth—L-glutamic acid, gram per deciliter |
| --- | --- | --- |
| 0 | +++ | 0.29 |
| 41.3 | ++++ | 1.13 |
| 67.2 | ++++ | 1.08 |
| 92.7 | ++++ | 1.34 |

Culture conditions: Similar to those employed in obtaining the results appearing in Table 5.

TABLE 7

| | Growth | L-glutamic acid, gram per deciliter |
| --- | --- | --- |
| Crude hydrolyzate: | | |
| Filtrate | ++++ | 1.34 |
| Mash unfiltered | +++ | 0.37 |
| Pure Glucose | ± | 0.06 |

Culture conditions: Similar to those employed in obtaining the results appearing in Table 5.

TABLE 8

| Catalyzer of hydrolysis | Hydrolyzed mash | | Fermented broth | |
| --- | --- | --- | --- | --- |
| | Neutraliser | Rate of hydrolysis, percent | Growth | L-glutamic acid, gram per deciliter |
| Hydrochloric acid | NaOH | 92.7 | ++++ | 1.34 |
| Sulfuric acid | NaOH | 93.1 | ++++ | 1.17 |
| Oxalic acid | CaCO₃ | 91.4 | +++ | 0.73 |
| Enzyme | none | 52.9 | +++ | 0.69 |

Culture conditions: Similar to those employed in obtaining the results appearing in Table 5.

EXAMPLE 1

A mash consisting of 8 kg. of sweet potato flour, 78.7 g. of $H_2SO_4$ and 22 l. of water was heated in an autoclave under a pressure of 3 kg./cm.$^2$ for 30 min. After cooling, the crude hydrolyzed mash was filtered. The rate of hydrolysis (rate of saccharification) was 92.4% and the filtrate contained 19.3 grams per deciliter of reducing sugars in the form of glucose.

A culture medium which contained the filtrate of crude hydrolyzed mash (5% of the medium being glucose), 1.6% of $NaNO_3$, 0.1% of $KH_2PO_4$, 0.04% of $MgSO_4.7H_2O$, 0.0005% of $FeSO_4$ and casein hydrolysate liquor (0.002% as total nitrogen), was prepared, neutralized and sterilized:

The described medium was inoculated with the strain No. 1999 (ATCC No. 13,403) analogous to Bacillus circulans and subjected to aerobic shaking culture at 30° C. With the lapse of time, sugar content decreased gradually while L-glutamic acid was produced in the medium, the amount thereof having gradually increased up to 1.75 grams per deciliter after 67 hours. Residual sugars were found to be 0.23 gram per deciliter in the form of glucose. pH of the medium gradually rose and reached 8.6 at the end of the culture. About 90% of the produced L-glutamic acid was recovered from the fermentation broth either by a concentration and crystallization method or by an ion exchange resin method.

EXAMPLE 2

A mash consisting of 8.3 kg. of wheat flour, 41.1 g. of HCl and 20 l. of water was heated in an autoclave under a pressure of 3 kg./cm.$^2$ for 30 min. The rate of hydrolysis was 9.7% and the filtrate contained 21.6 grams per deciliter of reducing sugars in the form of glucose.

Aerobic shaking culture was carried out in the same way as described in the foregoing example. After 50 hrs., 1.88 grams per deciliter of L-glutamic acid was produced and accumulated in the fermented broth. 2.10 g. of L-glutamic acid hydrochloride per 100 cc. of the broth was separated.

EXAMPLE 3

A mash consisting of 8.0 kg. of potato flour, 76 g. of oxalic acid and 20 l. of water was heated in an autoclave under a pressure of 3 kg./cm.$^2$ for 40 min. Calcium carbonate was added to the hydrolyzate and filtered. The rate of hydrolysis was 93.2% and the filtrate contained 18.9 grams per deciliter of reducing sugars in the form of glucose.

Aerobic shaking culture was carried out in a way similar to that described in Example 1. After 64 hrs., 1.51 grams per deciliter of L-glutamic acid was produced and accumulated in the fermented broth. 1.67 g. of L-glutamic acid hydrochloride per 100 cc. of the broth was separated.

EXAMPLE 4

A culture medium containing 2% of wheat bran, 2% of corn grain and 0.2% of $NaNO_3$ was inoculated with Aspergillums awamori and subjected to aerobic submerged culture for 40 hrs. to obtain a koji liquor. A mash containing 10% of steamed sweet potato had a 5% quantity of said koji liquor added thereto and was saccharificated at 40° C. for 5 hrs. The rate of hydrolysis was 51.4%. The crude hydrolyzed mash thus obtained was sterilized and filtered.

Aerobic shaking culture was carried out in the same way as described in Example 1. After 59 hrs., 1.03 grams per deciliter of L-glutamic acid was produced and accumulated in the fermented broth. 1.08 g. of L-glutamic acid hydrochloride per 100 cc. of the broth was separated.

EXAMPLE 5

The crude hydrolyzed mash obtained in Example 1 was used without filtration in place of the filtrate. Accordingly, the medium contained 5% (based on glucose) of the crude hydrolyzed mash.

Aerobic shaking culture was carried out in the same way as described in Example 1. After 63 hrs., 0.89 gram per deciliter of L-glutamic acid was produced and accumulated in the fermented broth. 0.90 g. of L-glutamic acid hydrochloride per 100 cc. of the broth was separated.

What is claimed is:

1. A fermentative process for the production of L-glutamic acid which comprises cultivating ATCC No. 13,403 in a culture medium consisting essentially of a crude hydrolyzed mash of starch, as the carbon source, and sodium nitrate, as the nitrogen source, and having a pH of between approximately 5.0 and 9.0, under aerobic conditions until appreciable quantities of L-glutamic acid are formed therein.

2. A fermentative process as in claim 1; wherein said sodium nitrate is present in an amount between approximately 0.6% and 5.0%, by weight, of said medium.

3. A fermentative process as in claim 1; wherein said crude hydrolyzed mash of starch is obtained by hydrolyzing at least one number of the group consisting of wheat, corn, potato, sweet potato and tapioca.

4. A fermentative process as in claim 3; wherein said hydrolyzing is effected by the action of acid.

5. A fermentative process as in claim 3; wherein said hydrolyzing is effected by an enzyme action.

6. A fermentative process as in claim 1; wherein said crude hydrolyzed mash of starch is filtered and the filtrate thereof is included in said culture medium.

7. A fermentative process for the production of L-glutamic acid which comprises cultivating ATCC No. 13,403 in a culture medium having a pH of between approximately 5.0 and 9.0 for a period of approximately 20 to 90 hours and under aerobic conditions at a temperature of approximately 20° C. to 40° C., said medium consisting essentially of a crude hydrolyzed mash of starch, as the carbon source, and sodium nitrate, as the nitrogen source.

8. A fermentative process as in claim 7; wherein said sodium nitrate is present in the culture medium in an amount equal to between approximately 0.6% and 5.0%, by weight, of said culture medium.

References Cited in the file of this patent

UNITED STATES PATENTS

| | | |
|---|---|---|
| 1,932,755 | Stiles et al. | Oct. 31, 1933 |
| 2,789,939 | Kita | Apr. 23, 1957 |
| 2,798,839 | Huang et al. | July 9, 1957 |

OTHER REFERENCES

Journal of Biological Chemistry, vol. 187, pp. 439–451 and 821–830 (1950).

Proceedings of the International Symposium on Enzyme Chemistry, Tokyo and Kyoto, 1957, pp. 464 to 468, pub. 1958, Maruzen, Tokyo.

Chemical Abstracts, 1957, vol. 51, 7643–7644.